US009722985B2

(12) United States Patent
Tartz et al.

(10) Patent No.: US 9,722,985 B2
(45) Date of Patent: Aug. 1, 2017

(54) SENSORY OUTPUT FOR IMAGE ASSOCIATION

(71) Applicant: QUALCOMM Incorporated, San Diego, CA (US)

(72) Inventors: Robert Scott Tartz, San Marcos, CA (US); Shaun William Van Dyken, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/267,572

(22) Filed: May 1, 2014

(65) Prior Publication Data
US 2015/0319153 A1 Nov. 5, 2015

(51) Int. Cl.
G06F 7/04 (2006.01)
G06F 15/16 (2006.01)
G06F 17/30 (2006.01)
H04L 29/06 (2006.01)
G06F 21/36 (2013.01)

(52) U.S. Cl.
CPC ............ H04L 63/08 (2013.01); G06F 21/36 (2013.01); G06F 2221/2133 (2013.01)

(58) Field of Classification Search
CPC .. G06F 2221/2133; G06F 21/36; G06F 21/31; H04L 63/08
See application file for complete search history.

(56) References Cited

U.S. PATENT DOCUMENTS

| 2008/0049939 | A1* | 2/2008 | Canetti et al. ................ 380/277 |
| 2010/0031330 | A1  | 2/2010 | Von et al. |
| 2010/0095350 | A1  | 4/2010 | Lazar et al. |
| 2010/0231541 | A1* | 9/2010 | Cruz-Hernandez ... G06F 3/0488 345/173 |
| 2011/0023110 | A1  | 1/2011 | Freund et al. |
| 2011/0113378 | A1* | 5/2011 | Boden et al. ................ 715/837 |
| 2011/0298691 | A1* | 12/2011 | DeLuca et al. ................ 345/1.3 |

(Continued)

FOREIGN PATENT DOCUMENTS

WO    WO-2008091675 A1    7/2008

OTHER PUBLICATIONS

Ravi Kuber, Wai Yu, Feasibility study of tactile-based authentication, Int. J. Human-Computer Studies 68 (2010) 158-181.*

(Continued)

*Primary Examiner* — David Cervetti
*Assistant Examiner* — Amie C Lin
(74) *Attorney, Agent, or Firm* — Kilpatrick Townsend & Stockton, LLP

(57) ABSTRACT

Methods, systems, computer-readable media, and apparatuses for authenticating users using the haptic, aural, and/or olfactory association processing channels that are unique to humans are presented. In some embodiments, a computer-implemented method includes displaying a plurality of images and generating a sensory output, wherein the sensory output includes a tactile sensation that corresponds to one of the plurality of images. The method further includes receiving input corresponding to a selection of an image of the plurality of images and determining whether the selected image matches the one of the plurality of images for which the sensory output corresponds.

30 Claims, 10 Drawing Sheets

(56) References Cited

U.S. PATENT DOCUMENTS

2012/0214442 A1    8/2012  Crawford et al.
2012/0286944 A1   11/2012  Forutanpour et al.
2013/0007875 A1*   1/2013  Jakobsson et al. ............. 726/19
2013/0031640 A1    1/2013  Fisk et al.
2014/0020087 A1    1/2014  Ooi

OTHER PUBLICATIONS

Juan Wu, Aiguo Song and Chuiguo Zou, A Novel Haptic Texture Display Based on Image Processing, Proceedings of the 2007 IEEE, International Conference of Robotics and Biomimetics, Dec. 15-18, 2007, Sanya, China.*
Lynette A. Jones and Michal Berris, The Psychophysics of Temperature Perception and Thermal-Interface Design, Proceeding of the 10th Symp. On Haptic Interfaces for Virtual Envir. & Teleoperator Systs (HAPTICS'02), 0-7695-1489-08/02 2002 IEEE.*
Deepa Mathew, vSmileys: Imaging Emotions through Vibration Patterns, Alternative Access: Feelings and Games 2005, Department of Coumputer Sciences, University of Tampere, Finland.*
International Search Report and Written Opinion—PCT/US2015/027414—ISA/EPO—Jul. 9, 2015.
Sasamoto, H., et al., "Undercover: Authentication Usable in Front of Prying Eyes," Proceeding of the Twenty-Sixth Annual Chi Conference on Human Factors in Computing Systems, CHI '08, Jan. 1, 2008,10 pages.
"Surface texture CAPTCHAS—touch and feel for online verification", IP.com journal, IP.com Inc., Feb. 1, 2013, 4 pages.

* cited by examiner

SENSORY OUTPUT FOR IMAGE ASSOCIATION

BACKGROUND

A number of devices, software applications, websites, and the like require authentication of a user before granting access. For example, Completely Automated Public Turing Tests to Tell Computers and Humans Apart (CAPTCHA) techniques may be used for authenticating that a human user is not a machine or computer when attempting to access devices or various on-line environments. A user may be required to pass a CAPTCHA test to access a device, access a website or webpage, access an application, buy tickets to an event, enter a comment on a blog, create an email account, or the like.

CAPTCHA techniques may become ineffective, for example, due to object character recognition (OCR) technologies becoming better at deciphering text of graphic CAPTCHAs, the difficulty of making sense of modified graphical characters on a display (especially in bright sunlight), the difficulty of discerning words of an audio CAPTCHA in view of background noise or user hearing impairments, and the like. By having more advanced CAPTCHA techniques, authentication of a user may become more user-friendly and also more resistant to unauthorized access by a machine or computer.

BRIEF SUMMARY

Aspects of the disclosure relate to authentication techniques for authorizing user access to a device, system, network, or the like using a sensory output. Certain embodiments are described including techniques (e.g., methods, systems, and computer program products) that make use of the haptic, aural, and/or olfactory association processing channels that are unique to humans for authenticating users. For example, a CAPTCHA technique may produce a tactile, olfactory, and/or auditory sensation that a user may associate with a corresponding graphic or image.

In some embodiments, a computer-implemented method includes displaying a plurality of images and generating a sensory output, wherein the sensory output includes a tactile sensation that corresponds to one of the plurality of images. The method further includes receiving input corresponding to a selection of an image of the plurality of images and determining whether the selected image matches the one of the plurality of images for which the sensory output corresponds.

In some embodiments, an apparatus includes a display configured to display a plurality of images and one or more sensation generators configured to generate one or more sensory outputs, the one or more sensation generators including a tactile sensation generator configured to generate a tactile sensation that corresponds to one of the plurality of images. The apparatus further includes an input device configured to receive input corresponding to a selection of an image of the plurality of images and a processor configured to determine whether the selected image matches the one of the plurality of images for which the sensory output corresponds.

In some embodiments, one or more computer-readable media storing computer-executable instructions that, when executed, cause one or more computing devices to: display a plurality of images; generate a sensory output, wherein the sensory output includes a tactile sensation that corresponds to one of the plurality of images; receive input corresponding to a selection of an image of the plurality of images; and determine whether the selected image matches the one of the plurality of images for which the sensory output corresponds.

In some embodiments, an apparatus includes means for displaying a plurality of images and means for generating a sensory output, wherein the sensory output includes a tactile sensation that corresponds to one of the plurality of images. The apparatus further includes means for receiving input corresponding to a selection of an image of the plurality of images and means for determining whether the selected image matches the one of the plurality of images for which the sensory output corresponds.

The foregoing, together with other features and embodiments, will become more apparent upon referring to the following specification, claims, and accompanying drawings.

BRIEF DESCRIPTION OF THE DRAWINGS

Aspects of the disclosure are illustrated by way of example. A further understanding of the nature and advantages of examples provided by the disclosure can be realized by reference to the remaining portions of the specification and the drawings.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The word "exemplary" is used herein to mean "serving as an example, instance, or illustration." Any embodiment or design described herein as "exemplary" is not necessarily to be construed as preferred or advantageous over other embodiments or designs.

Apparatuses, methods, systems, and computer-readable media are presented for authenticating users. For example, Completely Automated Public Turing Tests to Tell Computers and Humans Apart (CAPTCHA) techniques may be used for authentication to confirm that a user is not a machine or computer when attempting to access devices, software applications, or various on-line environments. A CAPTCHA test may be required, for example, when a user attempts to enter a webpage, buy tickets to an event, enter a comment on a blog, create an email account, or the like. Aspects of the disclosure relate to authenticating users using tactile or haptic, olfactory, and/or aural association processing channels that are unique to humans.

Figure 1:
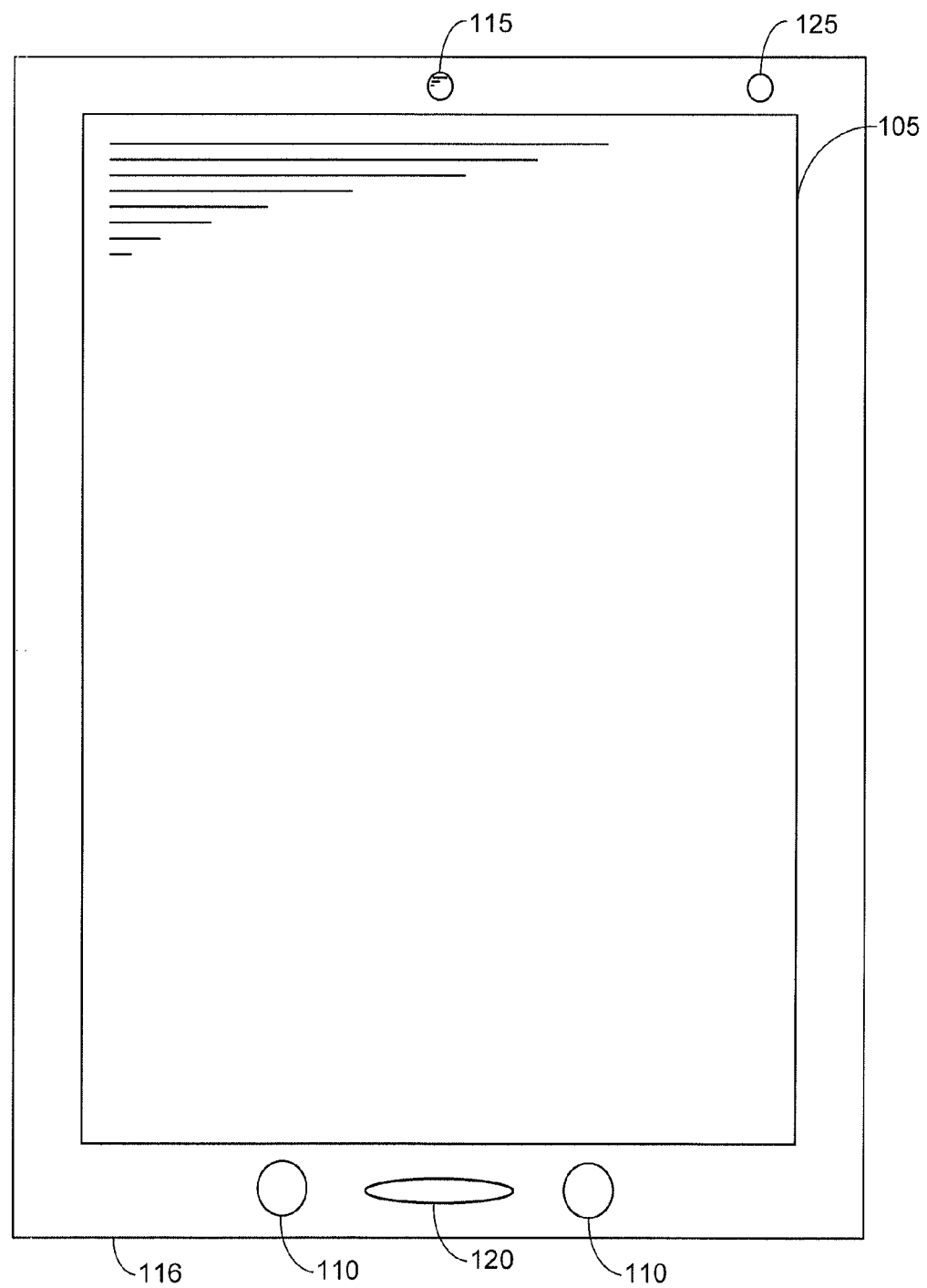
FIG. 1 illustrates an exemplary device according to some embodiments.
Figure 2:
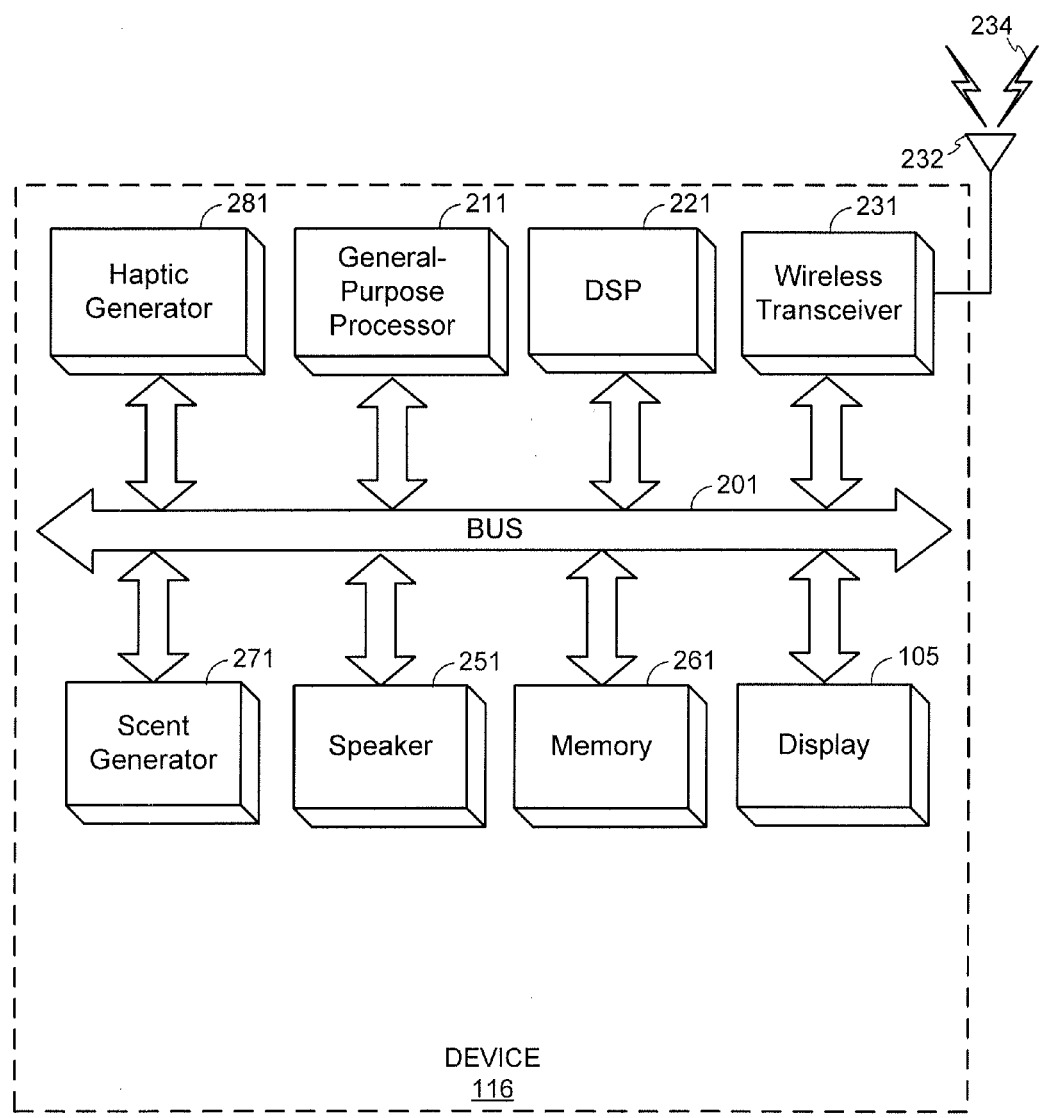
FIG. 2 is a block diagram illustrating an exemplary device according to some embodiments.

FIGS. 1 and 2 illustrate an exemplary device 116 that may implement one or more aspects of the disclosure. In some aspects, the device 116 is configured to implement, perform, and/or execute any and/or all of the features, methods, and/or method steps described herein, for example, with respect to the process 700 described below with reference to FIG. 7. Device 116 may be any type of computing device, such as a mobile device, a desktop computer, an automated kiosk, a point-of-sale terminal, a video game console, a set-top box, a remote control (e.g., for a television), or the like. The device 116 may include a device that has communications capabilities for communicating with one or more wired or wireless networks (e.g., the Internet, a wireless local area network, or the like) or a device without any ability to communicate with one or more networks. In some embodiments, a mobile device can also be called a system, subscriber unit, subscriber station, mobile station, mobile, remote station, remote terminal, user terminal, terminal, mobile terminal, wireless device, wireless terminal, wireless communication device, user agent, user device, Secure User Plane (SUPL) Enabled Terminal (SET) or user equipment (UE). A mobile device or SET may be a cellular telephone, a cordless telephone, a smartphone, a Session Initiation Protocol (SIP) phone, a wireless local loop (WLL) station, a personal digital assistant (PDA), a handheld device having wireless connection capability, a computing device, a laptop, a tablet computing device, any other processing device connected to or containing a modem (e.g., a wireless modem), a mobile device that does not have the ability to communicate with one or more networks (e.g., a gaming device without a modem, or the like), or the like. FIGS. 1 and 2 are meant only to provide a generalized illustration of various components, any and/or all of which may be utilized as appropriate. FIGS. 1 and 2, therefore, broadly illustrate how individual system elements may be implemented in a relatively separated or relatively more integrated manner.

As illustrated in FIG. 1, for example, device 116 may include one or more components such as a display 105, buttons and/or keys 110, a camera 115, a speaker output 120, and/or an olfactory output 125. In one or more arrangements, device 116 may further include a plurality of internal components, such as those illustrated in FIG. 2.

FIG. 2 is a block diagram illustrating an exemplary device 116, according to some embodiments. The device 116 is shown comprising hardware components that can be electrically coupled via a bus 201 (or may otherwise be in communication, as appropriate). As illustrated in FIG. 1, for example, the hardware elements of device 116 may include a haptic generator 281, one or more general purpose processors 211, a digital signal processor (DSP) 221, a wireless transceiver 231, an antenna 232, a display 105, a memory 261, a speaker 251, and/or a scent generator 271. Other hardware components (not shown) may include one or more special-purpose processors (such as digital signal processing chips, graphics acceleration processors, and/or the like), one or more input devices (such as a camera, a mouse, a keyboard, buttons and/or keys, and/or the like), one or more output devices (such as a printer and/or the like), a communications subsystem, and/or the like.

In some embodiments, the device 116 may be a mobile device and include one or more wireless transceivers 231 connected to the bus 201. In some embodiments, the device 116 is a computing device that may or may not include one or more wireless transceivers 231. For example, the device 116 may be a desktop computing device that includes or is connected to a modem (not shown), such as a wireless modem, for providing the device with access to one or more networks. The device 116 may further include a single antenna, multiple antennas, or an antenna array, which may correspond to antenna 232. The wireless transceiver 231 may be operable to receive a wireless signal 234 via antenna 232. Transceiver(s) 231 and the antenna(s) may be used to communicate wirelessly (e.g. according to signaling for GSM, WCDMA, LTE, CDMA2000 and/or WiFi IEEE 802.11) by entities such as device 116. The wireless signal 234 may be transmitted via a wireless network. In some embodiments, the wireless network may be any wireless network such as a wireless LAN (WLAN) such as WiFi, a Personal Access Network (PAN), such as Bluetooth™ or Zigbee™, or a cellular network (e.g. a GSM, WCDMA, LTE, CDMA2000 network). Wireless transceiver 231 via antenna 232 may be configured to receive various radio frequency (RF) signals 234 from one or more terrestrial transceivers. The device 116 may be supported by a variety of terrestrial wireless transceivers such as, but not limited to, wireless access points, femtocells, or the like.

In some embodiments, the display 105 may include any suitable display, a light emitting diode (LED) display, a liquid crystal display (LCD), a plasma display, a microelectromechanical systems display, or the like. In some embodiments, display 105 may be a touch screen display, such that a user may be able to provide touch-based user input to device 116 via display 105.

In some embodiments, the device 116 may further include various sensation generators, such as a haptic generator 281, scent generator 271, and/or speaker 251. In some embodiments, the haptic generator 281 may include an electrostatic haptic display, a vibrotactile generator, and/or a thermal display (e.g., using Peltier elements). Each of the sensation generators may generate one or more sensory outputs. For example, the haptic generator 281 including an electrostatic haptic display may generate a tactile sensation. The electrostatic haptic display may be integrated into the display 105, or may be a separate component independent of the display 105. The electrostatic haptic display may not be visible to a user, and may only be used to provide a sensory output. The tactile sensation produced by the electrostatic haptic display may be based on the electrostatic attraction of skin to a charged surface and may include direct electrical stimulation of the skin. In some embodiments, the tactile sensation may include a perception of a change in texture of the electrostatic haptic display based on electrostatic stimulation, and may be referred to as electrovibration tactile sensation. For example, the electrostatic haptic display may electrostatically stimulate a user by generating varying electrostatic fields that produce a small amount of current (e.g., microampere-level currents). The electrostatic fields may be controlled so that flow of the current into the skin of the user creates the perception of a desired texture. In some embodiments, the electrostatic haptic display may use one or more capacitors to generate the electrostatic fields. It will be understood by one of ordinary skill in the art that any electrostatic haptic display may be used to generate a tactile sensory output.

The haptic generator 281 may also include a vibrotactile generator that can generate a vibrotactile sensation. For example, the vibrotactile generator may include one or more mechanical devices that cause the device 116 to vibrate. The one or more mechanical devices may include an electromagnetic actuator (e.g., a solenoid, a voice coil, etc.), a rotary electromagnetic actuator (e.g., an eccentric rotating mass (ERM) motor, etc.), a non-electromagnetic actuator (e.g., a piezoelectric actuator, etc.), or the like. The vibrotactile generator may vary the intensity and/or the frequency of the vibration to create an oscillating movement that simulates a desired effect, such as an explosion or other event. For example, the vibrotactile generator may generate an oscillating vibration that a user may feel through the device 116. In some embodiments, the vibrotactile generator may include an array of vibrotactile devices that can be individually or collectively controlled to turn on and off at varying intensities and/or frequencies or durations to create the desired effect.

The haptic generator 281 may also include a thermal display. The thermal display may include, for example, one or more heating and/or cooling elements (e.g., Peltier elements) that can generate a heating or cooling sensation. The thermal display may be integrated into the display 105, or may be a separate component independent of the display 105. The thermal display may not be visible to a user, and may only be used to provide a sensory output.

The scent generator 271 may generate an olfactory sensation. For example, the olfactory sensation may include one or more fragrances or scents that can be emitted through olfactory output 125. The scent generator 271 may store a number of scents along with their chemical structures. Each scent and its chemical structure may be coded and converted into a file that may be accessed and executed to trigger generation and/or emission of the scent. The scent generator 271 may generate each scent by using a number of primary odors that are stored in the device 116 or external to the device 116. For example, the scent generator 271 may generate a particular fragrance by mixing a subset of the primary odors according to the chemical make-up of the fragrance. The primary odors may be stored using a removable cartridge.

The speaker 251 may generate an auditory sensation. For example, the speaker may play one or more audio file that can be output through the speaker output 120. The audio files may be stored in memory 261 or retrieved from a remote location (e.g., a remote network location, a remote server, the Internet, or the like).

The device 116 may also include a communications subsystem (not shown), which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. According to some embodiments, the wireless transceiver 231 and/or antenna 232 can be examples of a communication subsystem. In some embodiments, the communications subsystem may be linked to transceiver 231. The communications subsystem may permit data to be exchanged with a network (such as the networks described above), other computer systems, and/or any other devices.

The device 116 may also include DSP(s) 221 connected to the bus 201, general-purpose processor(s) 211 connected to the bus 201, and memory 261 connected to the bus 201. In some embodiments, memory 261 may include one or more computer-readable storage media, such as non-transitory media including local and/or network accessible storage. The memory 261 can include, without limitation, one or more disk drives, a drive array, one or more optical storage devices, Flash memory, and/or one or more solid-state storage devices, such as a random access memory ("RAM") and/or a read-only memory ("ROM"). The memory 261 may be programmable, flash-updateable, and/or the like. The memory 261 may be configured to implement any appropriate data storage, including without limitation, various file systems, database structures, and/or the like.

The device 116 may also comprise software elements located, for example, within the memory 216. The software elements may include an operating system, device drivers, executable libraries, and/or other code, such as one or more application programs. The application programs may comprise computer programs provided by various embodiments, and/or may be designed to implement methods and/or configure devices or systems, as described herein. Merely by way of example, one or more procedures described with respect to the method(s) or processes discussed above, for example as described with respect to FIG. 7, may be implemented as code and/or instructions executable by a computer (and/or a processor within a computer). In an aspect, such code and/or instructions may be used to configure and/or adapt a general purpose computer, a special purpose computer, or other device to perform one or more operations in accordance with the described methods or processes. For example, functions may be stored as one or more instructions or code in memory 261 and executed by general-purpose processor(s) 211, specialized processors, or DSP(s) 221. These functions may include, for example, displaying a plurality of images on the display 105, generating a sensory output (e.g., a tactile sensation using an electrostatic haptic display, a vibrotactile generator, and/or a thermal display using heating and/or cooling elements, olfactory sensation using scent generator 271, auditory sensation using speaker 251, or the like) that corresponds to one of the plurality of images, receiving input via the display 105 or other input device that corresponds to a selection of an image of the plurality of images, and determining whether the selected image matches the one of the plurality of images for which the sensory output corresponds. Memory 261 may be a processor-readable memory and/or a computer-readable memory that stores software code (programming code, instructions, etc.) configured to cause the general-purpose processor(s) 211 and/or DSP(s) 221 to perform the functions described. In other embodiments, the functions described may be performed in hardware.

A set of these instructions and/or code may be stored on a computer-readable storage medium, such as the memory 261. In some cases, the storage medium might be incorporated within the device 116. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. In some embodiments, these instructions might take the form of executable code, which may be executable by the device 116. In some embodiments, the instructions may take the form of source and/or installable code, which, upon compilation and/or installation on the device 116 (e.g., using any of a variety of generally available compilers, installation programs, compression/decompression utilities, etc.) take the form of executable code that may be executable by the device 116.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. In an embodiment implemented using the device 116, various computer-readable media might be involved in providing instructions/code to one or more processors 211 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the memory 261. Volatile media include, without limitation, dynamic memory. Transmission media include, without limitation, coaxial cables, copper wire and fiber optics, including the wires that comprise the bus 201, as well as the various components of a communications subsystem (and/or the media by which the communications subsystem provides communication with other devices). Hence, transmission media can also take the form of waves (including without limitation radio, acoustic and/or light waves, such as those generated during radio-wave and infrared data communications).

Figure 3:
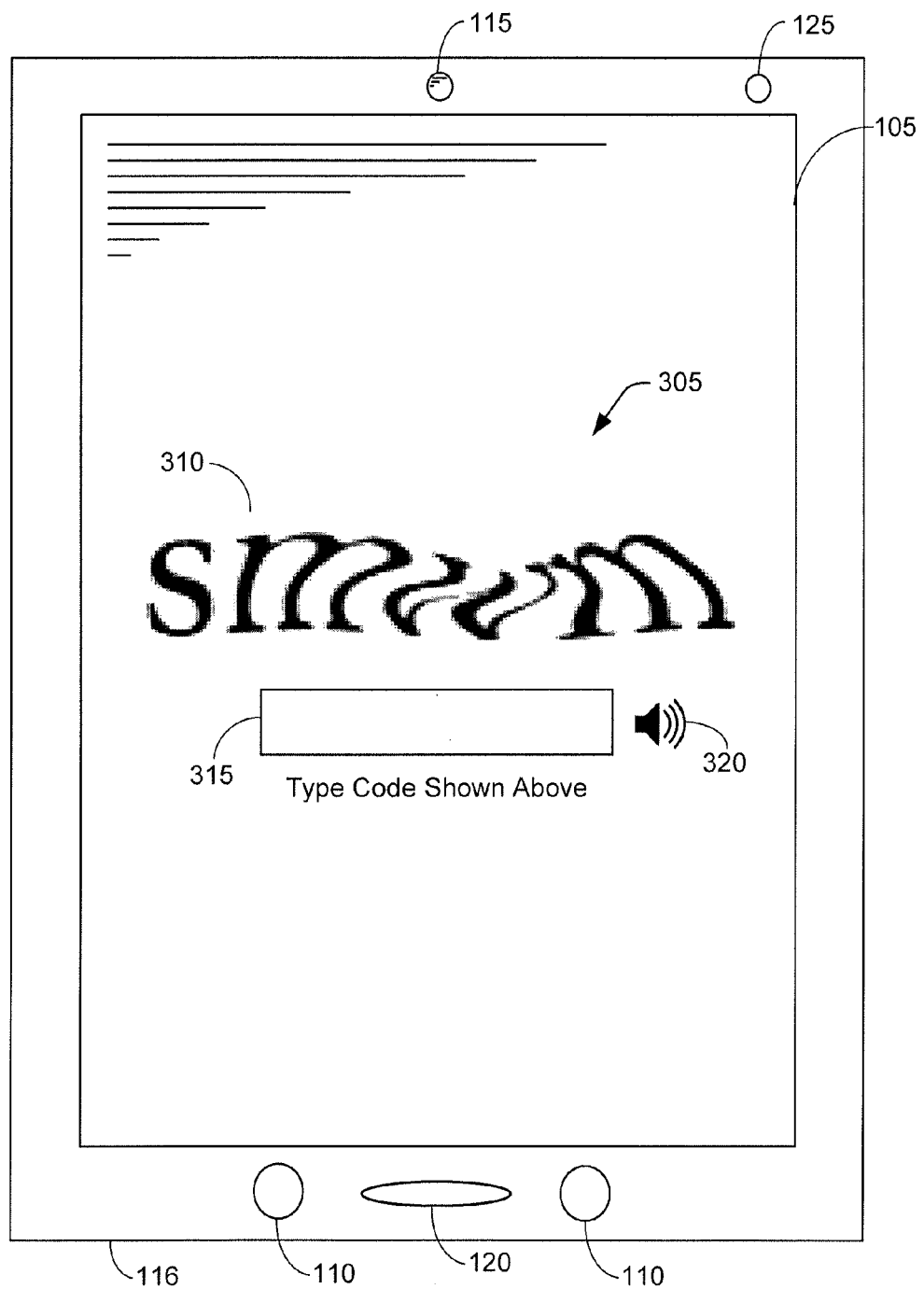
FIG. 3 illustrates an exemplary device with access authentication according to some embodiments.

As noted above, Completely Automated Public Turing Tests to Tell Computers and Humans Apart (CAPTCHA) techniques may be used for authentication to confirm that a user is not a machine or computer when attempting to access devices, software applications, or various on-line environments. FIG. 3 illustrates an exemplary device 300 with access authentication using text-based CAPTCHA techniques. In one example, a user may be required to pass the CAPTCHA test 305 in order to gain access to the device 116 or to use the device, for example, to gain access to a webpage, to buy tickets to an event (e.g., on an automated kiosk, a point-of-sale terminal, or the like), enter a comment on a blog, create an email account, or the like. The CAPTCHA test 305 includes a text-based graphic CAPTCHA 310 and an audio CAPTCHA 320. The graphic CAPTCHA 310 includes a set of graphically modified characters or a photo of characters. A user is prompted to enter the correct characters in text input box 315 for authentication purposes. For example, the characters s-m-w-m must be entered into text input box 315 in order for the user to be authenticated.

A user may select the audio CAPTCHA 320 icon in order to invoke the audio CAPTCHA. In response to receiving a selection of the audio CAPTCHA 320 icon, an audio signal may be output via speaker output 120 that articulates what is shown on the display 105. For example, the letters "s," "m," "w," and "m" may be output as an audio signal via speaker output 120. The user must then enter the letters into the text input box 315 in order to be authenticated. In some embodiments, the audio CAPTCHA 320 technique may mask a desired word from computer speech-to-text algorithms. For example, an audio signal of a desired letter or word may be played along with other noise in order to mask the desired word from being recognized by a computer.

Various problems are associated with text-based graphic and audio CAPTCHA techniques. For example, graphic CAPTCHA is becoming less effective as object character recognition (OCR) technologies become better at deciphering text, even text that has been distorted. Furthermore, human users oftentimes cannot make sense of the modified graphical characters on a display due to the distortion of the characters, visual impairments of the user, or the like. This is especially the case as the modified graphical characters are made more challenging in the effort to defeat increasingly sophisticated OCR technologies. Glare and bright ambient light also add to the difficulty of humans identifying the graphic characters on a display. In contrast, computers that may attempt unauthorized access to the underlying device or system are not affected by glare and bright light. With regard to some audio CAPTCHA techniques, it may be difficult for human users to discern the letters or word in view of the background noise, requiring a high cognitive load for the user. Further, a noisy location, which is often present in mobile usage environments or environments with kiosks or point-of-sale terminals, may add to the difficulty for humans to discern the desired letters or word from the audio signal. Even further, a user with a hearing impairment may struggle to discern an audio signal. On the other hand, computers are not affected by the noisy external environment.

Other text-based authentication techniques may also be used for CAPTCHA type authentication. For example, braille is a text-based authentication technique that may be used for visually impaired users. One problem associated with using braille or other text-based authentication techniques is that a computer may detect the text-based pattern (e.g., a series of dots) on the display, and may determine the solution to the authentication test based on the detected pattern.

Embodiments described herein include non-text based authentication techniques that use tactile or haptic, olfactory, and/or aural association processing channels that are unique to humans. The non-text based authentication techniques disclosed herein may be image and concept based, requiring the associative processing channels of a human user to cognitively associate a produced sensory output or sensation (e.g., tactile, olfactory, and/or aural sensation) with a concept displayed in a corresponding graphic or image. For example, the device 116 may generate a tactile, olfactory, and/or auditory sensation that a user may associate with a concept displayed in a corresponding graphic or image. In some examples, the concept is the subject or item displayed in the image. In contrast, the text-based authentication techniques described above present a graphic, braille, or audio signal that directly corresponds to the specific displayed text or image of text (e.g., an image of a-b-c-d is displayed, and a text-based braille CAPTCHA test conveys the letters a-b-c-d that a user must enter or speak to pass the test). The non-text based mental or cognitive authentication tests described herein rely on the association between sensory outputs and concepts depicted in one or more images (which are not text-based), and are thus based on a mental association of the user between the sensory output and the concept displayed in the image or images. These non-text based authentication techniques provide user-friendly authentication techniques that are resistant to unauthorized access by computers that cannot make the cognitive leap from a sensory output to a concept depicted in an image.

Figure 4:
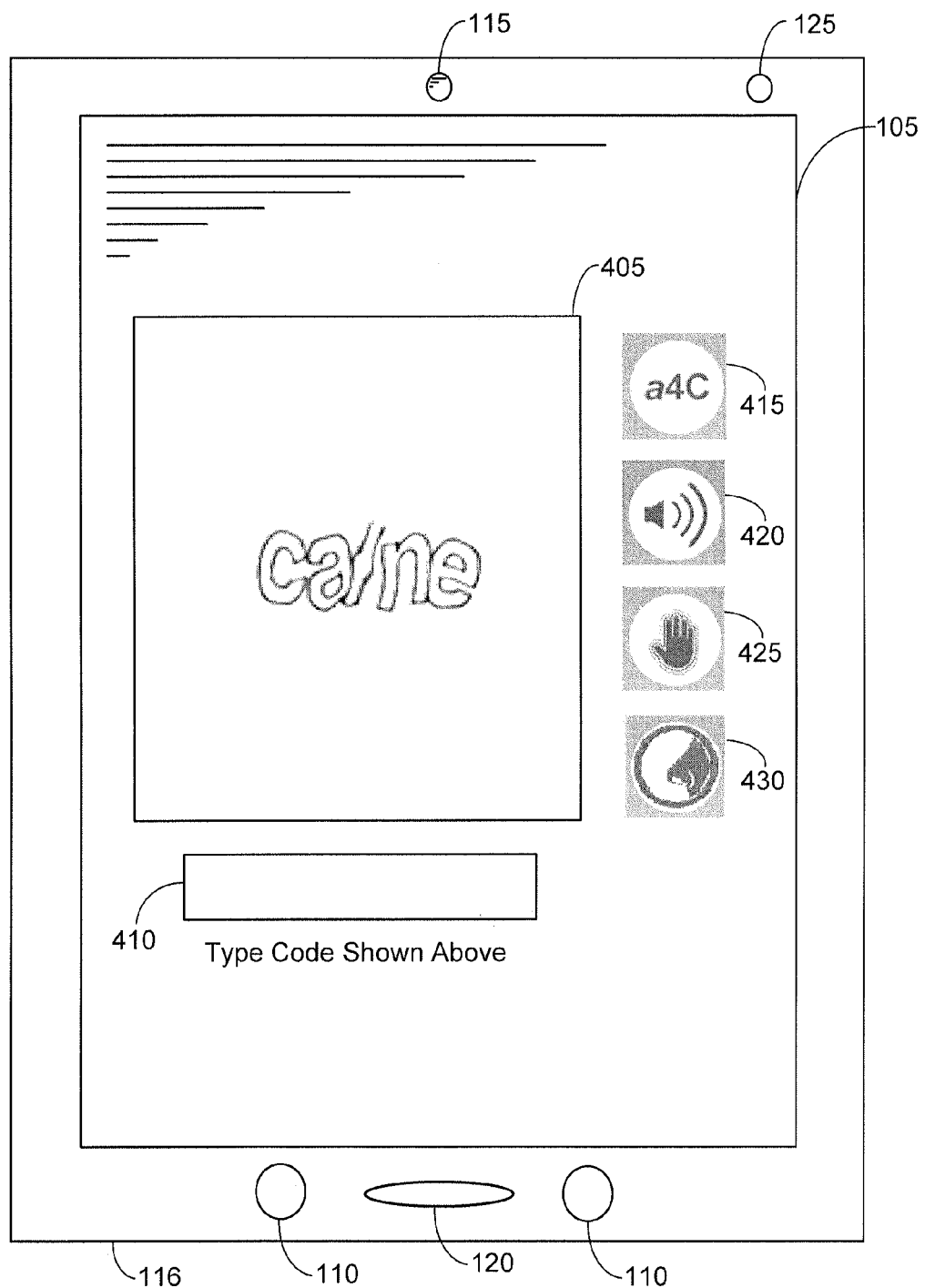
FIG. 4 illustrates another exemplary device with access authentication according to some embodiments.

FIG. 4 illustrates an exemplary device 116 that provides a non-text based access authentication test using a tactile, olfactory, and/or auditory sensation. A user may be required to pass a CAPTCHA test to gain access to the device 116 or to use the device, for example, to gain access to a webpage, purchase an item on an automated kiosk or point-of-sale terminal, create an account, or the like. For example, when the device 116 receives a request from a user to access the device 116, access a webpage, purchase an item, etc. using buttons 110 or touch-screen display 105, the processor 211 may randomly select text, one or more images, a fragrance, and/or an audio file from the memory 261 or a fragrance storage device to present as a CAPTCHA test on the display 105.

A user may initially be presented with the text-based CAPTCHA test 405 and may be prompted to enter the corresponding text in the text box 410. The user may be presented with various options 415-430 that allow the user to change the type of CAPTCHA test that is presented in display 105. The CAPTCHA test options include a graphic CAPTCHA icon 415, an audio CAPTCHA icon 420, a tactile or haptic CAPTCHA icon 425, and/or an olfactory CAPTCHA icon 430. In some embodiments, the device 116 may not initially present the user with an option for a text-based graphic CAPTCHA and/or an option for an audio based CAPTCHA. In such embodiments, the initially displayed CAPTCHA may include a tactile and/or an olfactory CAPTCHA, such as the tactile or haptic CAPTCHA 505 displayed in FIG. 5.

Figure 5:
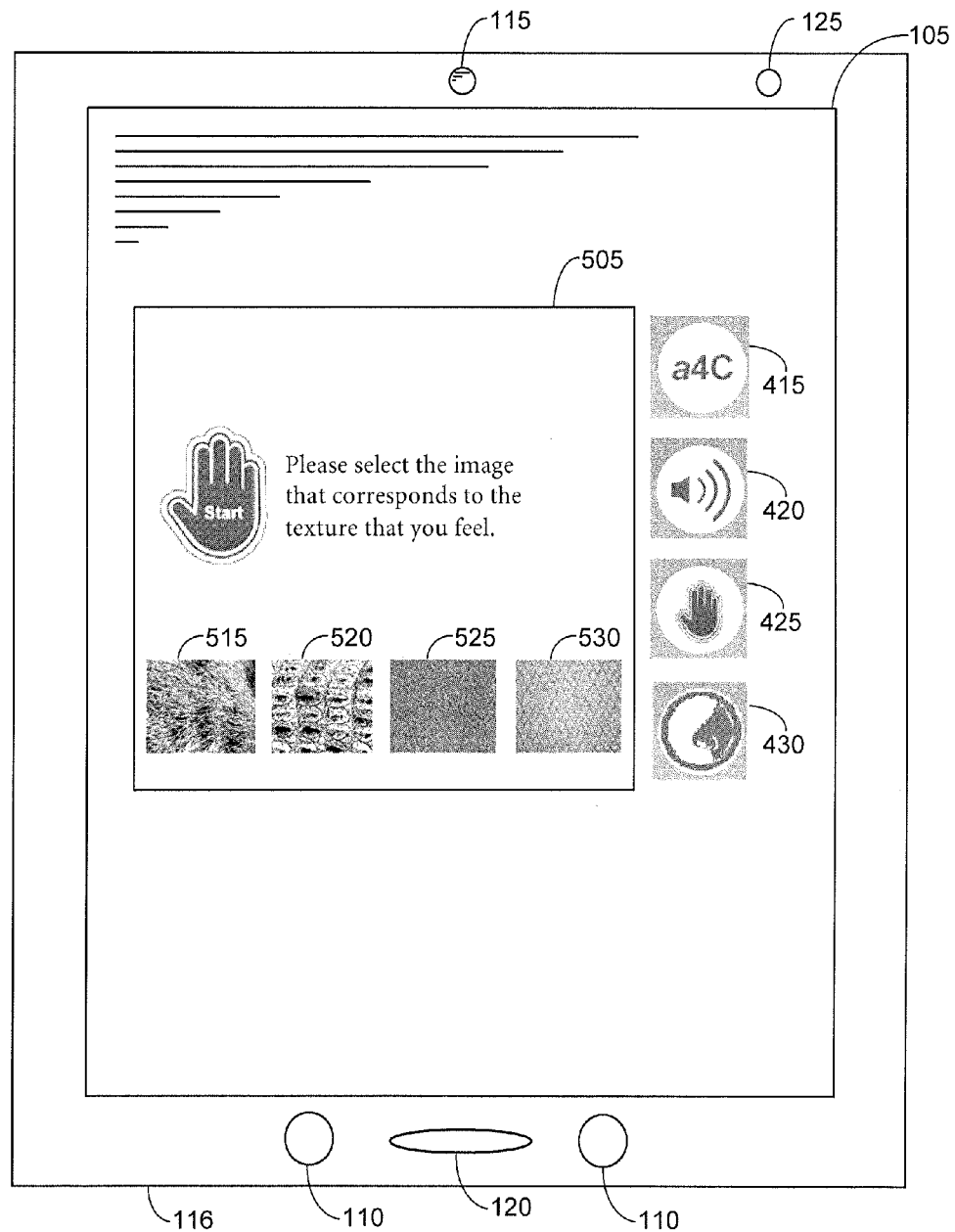
FIG. 5 illustrates another exemplary device with access authentication according to some embodiments.

The user may select the tactile or haptic CAPTCHA icon 425 in order to advance to the CAPTCHA test 505 displayed in FIG. 5. The haptic CAPTCHA 505 test includes a non-text based haptic or tactile challenge that relies on the associative abilities of a human user to associate a sensory output to a concept depicted in one or more images. Once the tactile or haptic CAPTCHA icon 425 is selected, the processor 211 may randomly select and display a set of images 515-530 on the display 105. The sensation generators of device 116, or the processor 211, may then cause a tactile sensation to be generated as a sensory output that a user must cognitively associate with a concept displayed in one or more of the displayed images 515-530. For example, the haptic generator 281 (e.g., the electrostatic haptic display, the vibrotactile generator, and/or the thermal display) may generate the tactile sensation. The display 105 may present text that instructs the user to perform certain actions. For example, text may be displayed that instructs the user to "Please Select the Image that You Feel," "Please Select the Image that Corresponds to the Texture that You Feel," or any other instruction that indicates an action for the user to perform with respect to the displayed CAPTCHA 505 test. The text may change for each different sensory output that is used for the selected CAPTCHA test (e.g., tactile, olfactory, or the like).

As one example, the electrostatic haptic display of the haptic generator may generate a tactile sensation that creates a change in texture on the display 105. For example, the change in texture may occur anywhere on the display 105. In some instances, the change in texture may occur on a test portion of the display 105. The change in texture corresponds to the one of the plurality of images. The plurality of images may include any suitable number of images, depending on the desired security requirements of the authentication. For example, the plurality of images may be anywhere from 3 to 20 images. As illustrated in FIG. 5, the group of images 515-530 includes an image 515 depicting cat fur, an image 520 depicting alligator skin, an image 525 depicting sand paper, and an image 530 depicting a patterned surface. The tactile sensation output may include a change in texture of the display to include a rough feeling similar to the texture of alligator skin. It will be understood by one of ordinary skill in the art that various other textures may be generated using the electrostatic haptic display, such as a furry texture depicting the perception of an animal, a rough texture depicting the perception of leather or another material, a soft or silky texture depicting the perception of a marshmallow, silk, or other soft material, or any other texture that depicts the perception of a concept illustrated in a displayed image.

After a user experiences the tactile sensation, the user may associate the sensation to the concept of alligator skin displayed in the image 520. Based on the association by the user, the user may then select the image 520 using one or more of the buttons 110 and/or the touch-screen display 105. Once the user selects image 520 from the group of images 515-530, the processor 211 may receive an indication of the selected image, and may determine whether the selected image matches the image that correctly describes the concept illustrated by the tactile sensation. In some embodiments, the processor 211 may determine whether the selected image matches the correct image by using a lookup function and/or table. For example, a memory 261 (e.g., a database stored in memory 261) may store a lookup table with the correct tactile feedback sensation and image correlations (e.g., correlating the rough texture to the image of wood). The processor 211 may refer to the lookup table and may compare the stored, associated image that corresponds to the particular tactile sensation that has been output with the selected image to determine if a match exists. If a match is determined, the processor confirms that the selected image is the correct image for the particular tactile sensation.

Based on the matching determination, the processor 211 may determine whether the user is authorized to access the device, web page, or other service the user may be attempting to access. Accordingly, the processor 211 authenticates the user if the selected image matches the concept illustrated by the tactile sensation. In some embodiments, in addition to basing the access authentication decision on whether the selected image matches the tactile sensation, the processor 211 may also receive additional data, such as the time at which the user first attempted access, a number of attempted selections, or the like. In some embodiments, the processor 211 may also base the access authentication decision on a time period between the first presentation of the CAPTCHA on the display 105 and the receipt of an image selection by the user. It will be understood by one of ordinary skill in the art that other factors may be contemplated when determining access authentication. For example, the user may be required to complete a number of successful matching tests in order to be authenticated.

Figure 5A:
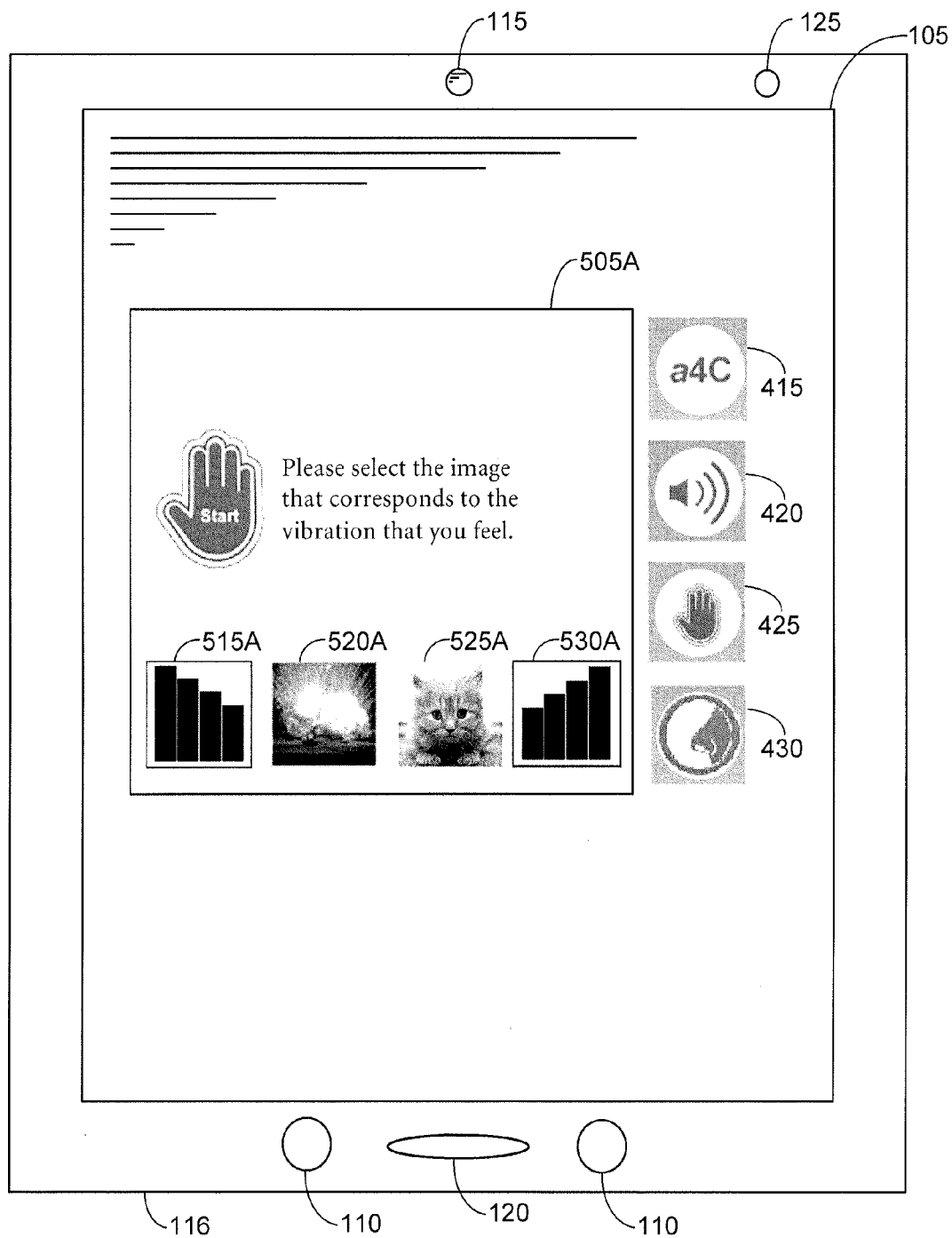
FIG. 5A illustrates another exemplary device with access authentication according to some embodiments.

As another example, the vibrotactile generator of the haptic generator 281 may generate a tactile sensation that includes vibrotactile feedback to the user. The vibrotactile feedback may include a vibration of one or more components of the device 116. For example, the vibrotactile generator may include one or more mechanical devices (e.g., an electromagnetic actuator, a rotary electromagnetic actuator, a non-electromagnetic actuator such as a piezoelectric actuator, or the like) that cause the device 116 to vibrate. For example, with reference to the CAPTCHA test 505A illustrated in FIG. 5A, a sudden, intense vibration of the device 116 may be generated to prompt the user to select a corresponding image. It will be understood by one of ordinary skill in the art that various other vibrotactile feedback sensations may be generated using the vibrotactile generator. After a user experiences the vibrotactile feedback sensation, the user may associate the feedback to the concept of the explosion displayed in the image 520A. Based on the user's association of the vibrotactile feedback to the concept depicted in image 520A, the user may select the image 520A using one or more of the buttons 110 and/or the touch-screen display 105.

Once the user selects the image 520A, the processor 211 may receive an indication of the selected image, and may determine whether the selected image is the image that correctly describes the concept illustrated by the vibrotactile feedback. In some embodiments, the processor 211 may determine whether the selected image 520A is the correct image by using a lookup function and/or table, as described above. If a match is determined, the processor confirms that the selected image 520A is the correct image for the particular tactile sensation.

The processor 211 may then determine whether the user is authorized to access the device, web page, or other service that the user may be attempting to access. The processor 211 may authenticate the user if the selected image 520 matches the concept illustrated by the vibrotactile feedback sensation. For example, if the user correctly selects the image 520A depicting the concept of an explosion, the processor 211 will grant the user with access. In some embodiments, the processor 211 may also receive a time at which the user first attempted access, a number of attempted selections, a time period between the first presentation of the CAPTCHA on the display 105 and the receipt of an image selection by the user, or the like. It will be understood by one of ordinary skill in the art that other factors may be contemplated when determining access authentication. For example, the user may be required to complete a number of successful matching images in order to be authenticated.

In some embodiments, more than one tactile sensation may be generated to correspond to an image that must be selected by the user for authentication. For example, the electrostatic haptic display, the vibrotactile generator, and/or the thermal display of the haptic generator 281 may be used sequentially or concurrently to provide two or more tactile sensations that a user may associate with an image. As one example, the thermal display may generate a small amount of heat through the display 105 and the vibrotactile generator may generate a sudden, intense vibration of the device 116. The vibrotactile generator may generate the vibration at the same time that the heat is generated, or may generate the vibration to follow generation of the heat. In some embodiments, the vibration may be generated prior to generation of the heat. In response to feeling the heat and the intense vibration, the user may associate the two sensations to the concept of the explosion displayed in the image 520A of FIG. 5A, and may select the image 520A for authentication.

In another example, the electrostatic haptic display may generate a texture that progressively increases in roughness and the vibrotactile generator may generate an increasingly intense vibration. The electrostatic haptic display may generate the texture at the same time that the vibrotactile generator generates the vibration, or may generate the texture before or after the vibration. In response to feeling the progressively increased texture and the increasingly intense vibration, the user may associate the two sensations to the concept of the incline displayed in the image 530A of FIG. 5A. The user may then select the image 530A for authentication.

The processor 211 may then determine whether the selected image 520A and/or 530A matches the image that correctly describes the concept illustrated by the tactile sensations, and if the match is confirmed, the user is authorized to access the device, web page, or other service that the user may be attempting to access.

Figure 6:
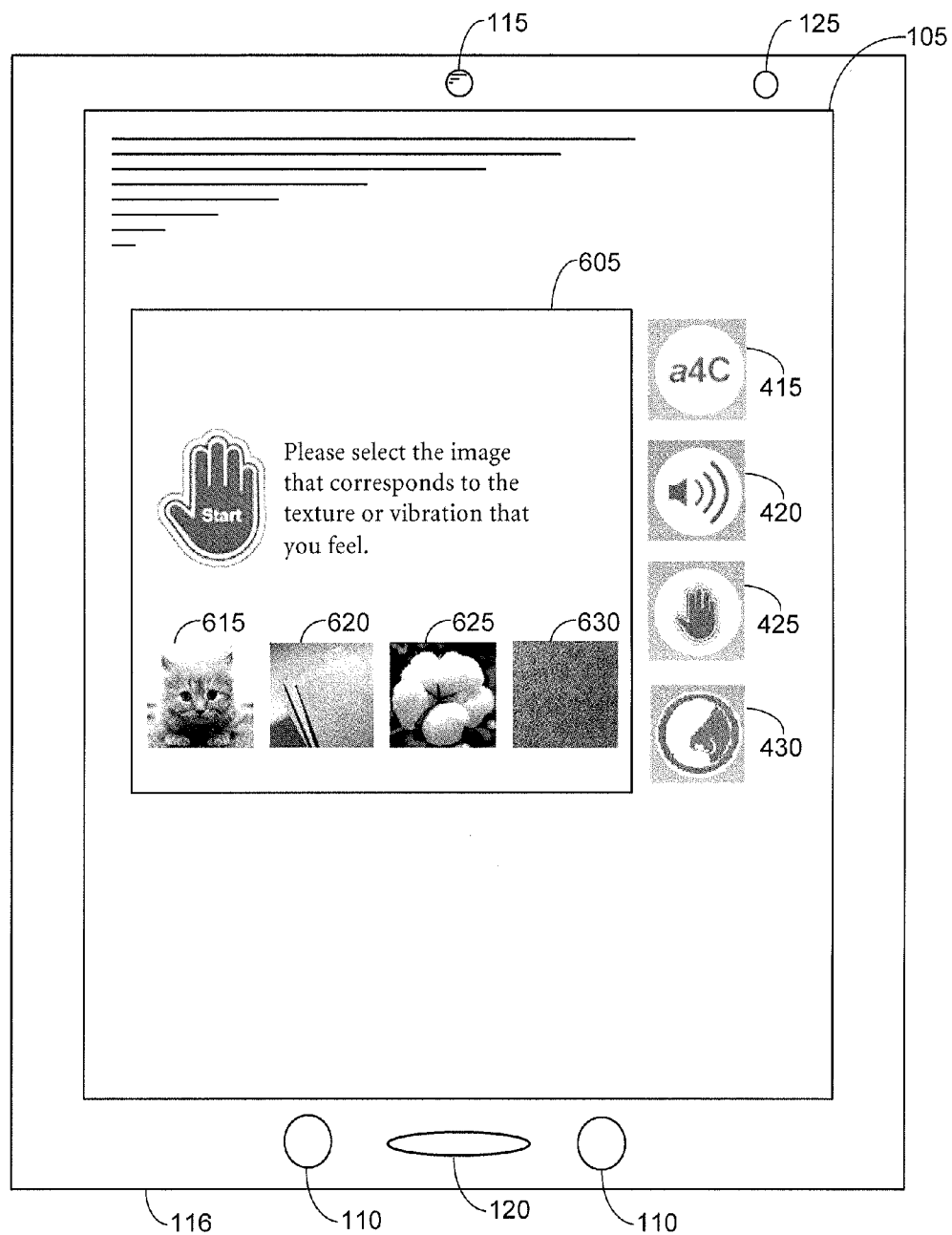
FIG. 6 illustrates another exemplary device with access authentication according to some embodiments.

In some embodiments, a user may be required to complete more than one haptic CAPTCHA test in order to be authenticated. In such embodiments, the user must select multiple correct images in order to be authenticated. For example, as illustrated in FIG. 6, after the user successfully passes the CAPTCHA test 505 or 505A by selecting the proper image, the processor 211 may present the user with a second CAPTCHA test 605 by randomly selecting and displaying a set of images 615-630 on the display 105. The processor 211 may then generate a second sensory output that a user must cognitively associate with a concept displayed in one or more of the displayed images 615-630. The second sensory output may be generated by the device 116 in response to determining that the image selected in FIG. 5 matches the image for which the previously generated sensory output corresponds. In some embodiments, several CAPTCHA tests may be presented in order for the user to be authenticated. For example, a user may be required to pass four CAPTCHA tests in order to obtain access to a device, website, application, or the like, similar to entering an authentication password or personal identification number.

Similar to the CAPTCHA tests 505 and 505A, in order to pass CAPTCHA test 605, the user must cognitively associate a tactile or haptic sensory output with a concept displayed in one or more of the displayed images 615-630. For example, the electrostatic haptic display and/or the vibrotactile generator of the haptic generator 281 may generate the tactile sensation. In one example, the electrostatic haptic display may generate an electrostatic field that creates a texture sensation on the display 105 emulating the feel of sandpaper. In response, a user may associate the sandpaper-like texture to the concept of the sandpaper displayed in the image 630, and may select the image 630 for authentication. The processor 211 may then determine whether the selected image 630 matches the image that correctly describes the concept illustrated by the tactile sensation. If the match is confirmed, the user passes the second CAPTCHA test 605 and is authorized to access the device, web page, or other service that the user may be attempting to access.

In another embodiment, the vibrotactile generator may generate a vibration that emulates the purring of a cat. The user may associate the cat-like vibrations to the concept of the cat displayed in the image 615, and may select the image 615 for authentication. The processor 211 may determine whether the selected image 615 matches the image that correctly describes the concept illustrated by the tactile sensation, and if the match is confirmed, the user passes the second CAPTCHA test 605 and is authorized to access the device, web page, or other service that the user may be attempting to access.

In another embodiment, the electrostatic haptic display may generate an electrostatic field that creates a furry texture sensation on the display 105 emulating the feel of cat fur and the vibrotactile generator may generate a vibration that emulates the purring of a cat. The user may associate the cat-like texture and vibrations to the concept of the cat displayed in the image 615, and may select the image 615 for authentication. The processor 211 may then determine whether the selected image 615 matches the image that correctly describes the concept illustrated by the two tactile sensations. If the match is confirmed by the process 211, the user passes the second CAPTCHA test 605 and is authorized to access the device, web page, or other service that the user may be attempting to access.

Figure 7:
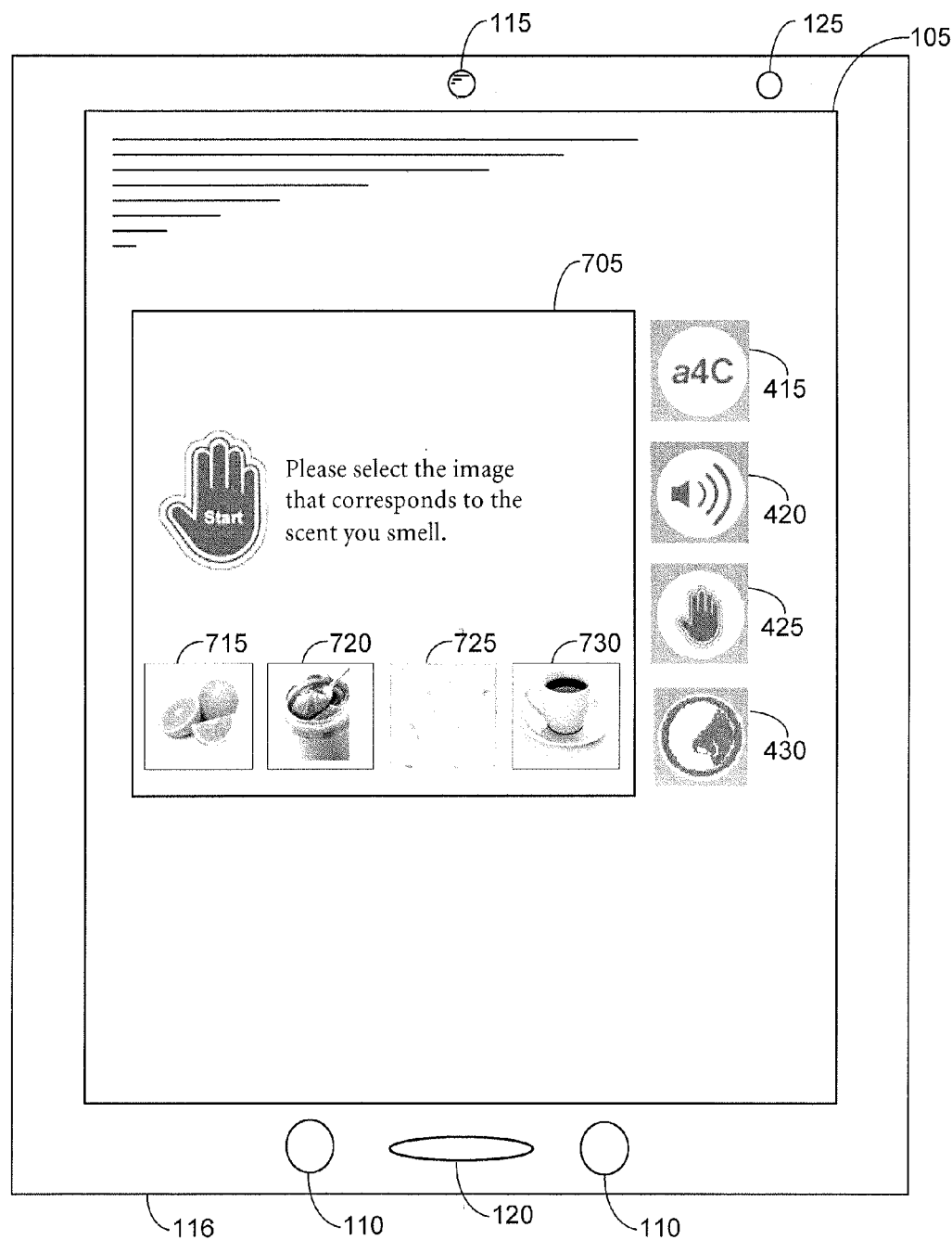
FIG. 7 illustrates another exemplary device with access authentication according to some embodiments.

In some embodiments, the user may select the olfactory CAPTCHA icon 430 to generate an olfactory CAPTCHA. In response, the processor 211 may randomly select and display a set of images 715-730 on the display 105, as illustrated in FIG. 7. The scent generator 271 may then generate an olfactory sensation as a sensory output that a user must cognitively associate with a concept displayed in one or more of the displayed images. For example, the scent generator 271 may generate an olfactory sensation, which may be output via olfactory output 125. The olfactory sensation may include a smell that corresponds to the concept illustrated in one of the images. For example, the scent generator 271 may generate the scent of a marshmallow. The user may associate the smell of the marshmallow to the concept of the marshmallows displayed in the image 725. Based on the association by the user, the user may then select the image 725 using one or more of the buttons 110 and/or the touch-screen display 105. After the user selects the image 725, the processor 211 receives an indication of the selected image 725, and then determines whether the selected image 725 is the image that correctly describes the concept illustrated by the smell. In some embodiments, the processor 211 may determine whether the selected image is the correct image by using a lookup function and/or table, as described above.

If a match is determined, the processor 211 confirms that the selected image 725 is the correct image for the particular scent. If the confirmation is made, the processor 211 determines that the user is authorized to access the device, web page, or other service the user may be attempting to access. Accordingly, the processor 211 authenticates the user if the selected image 725 matches the concept illustrated by the scent. In some embodiments, the processor 211 may also base the access authentication decision on additionally received data, such as the time at which the user first attempted access, a number of attempted selections, a time period between the first presentation of the CAPTCHA on the display 105 and the receipt of an image selection by the user or the like. It will be understood by one of ordinary skill in the art that other factors may be contemplated when determining access authentication.

In some embodiments, an auditory sensation, such as an audio signal, may be played along with a tactile sensation and/or an olfactory sensation. For example, the user may select the audio CAPTCHA icon 420 to generate a CAPTCHA supplemented with an audio signal. In response, the processor 211 may generate an audio signal that a user must cognitively associate with a concept displayed in one or more of the displayed images. The audio signal may not explicitly say what is depicted in the image(s), but instead may play a sound that is associated with the image. For example, if a dog is displayed in the image, the audio signal may play a sound of a dog barking instead of playing an audio signal that says "dog." The audio signal may supplement a tactile and/or olfactory sensation that is also associated with the concept. For example, the speaker 251 may produce an audio signal, which may be output via speaker output 120. For example, with reference to FIG. 5A, the speaker 251 may produce an audio signal with the sound of an explosion while the thermal display of the haptic generator 281 may produce a small amount of heat through the display 105 to depict the concept of the explosion illustrated in image 520A. In another example, the speaker 251 may produce the audio signal with the sound of an explosion while the vibrotactile generator may generate a sudden, intense vibration of the device 116. In another example, the speaker 251 may produce the audio signal with the sound of an explosion while the thermal display produces the small amount of heat and also while the vibrotactile generator generates the sudden, intense vibration. In some embodiments, a tactile, olfactory, and an audio signal may be generated to depict the concept of the explosion illustrated in image 520A.

The user may associate the sound, the tactile sensation, and/or an olfactory sensation of the explosion to the concept of the explosion displayed in the image 520A. Based on the association by the user, the user may then select the image 520A using one or more of the buttons 110 and/or the touch-screen display 105. After the user selects the image 520A, the processor 211 receives an indication of the selected image. The processor then determines whether the selected image matches the image that correctly describes the concept illustrated by the sound, tactile sensation, and/or the olfactory sensation. In some embodiments, the processor 211 may determine whether the selected image is the correct image by using a lookup function and/or table, as described above.

Based on the matching, the processor 211 may determine whether the user is authorized to access the device, web page, or other service the user may be attempting to access. Accordingly, the processor 211 authenticates the user if the selected image matches the concept illustrated by the sound, tactile sensation, and/or the olfactory sensation. In some embodiments, the processor 211 may also determine whether to authenticate the user based on additionally received data, such as the time at which the user first attempted access, a number of attempted selections, the receipt of an image selection by the user, or the like. It will be understood by one of ordinary skill in the art that other factors may be contemplated when determining access authentication.

Figure 8:
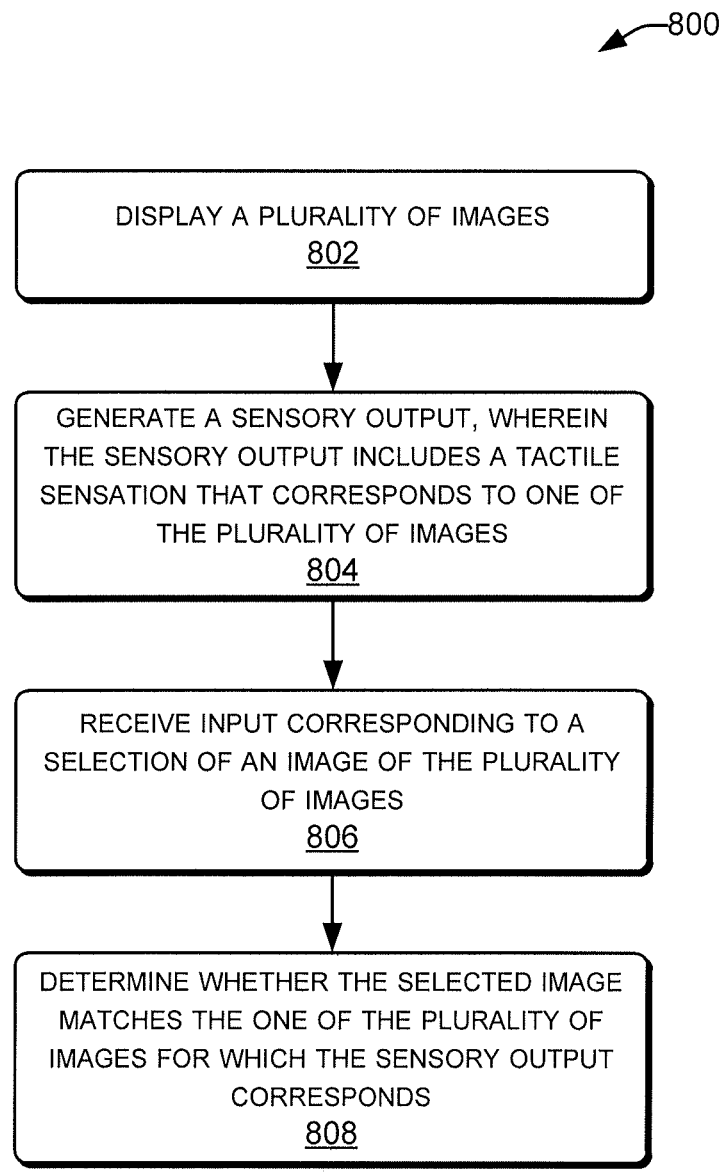
FIG. 8 is a flowchart illustrating an exemplary process for authenticating a user.

FIG. 8 illustrates an exemplary process 800 for non-text based authentication using tactile or haptic, olfactory, and/or aural association processing channels that are unique to humans. Process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 800 may be performed by a computing device, such as the device 116 described above with reference to FIGS. 1-7 or the device 900 described below with reference to FIG. 9.

Process 800 may begin at 802 by displaying a plurality of images. For example, the processor 211 may be configured to select the plurality of images for display on the display 105 in response to a CAPTCHA test being generated for authenticating a user for access to a device, web page, or other service that a user may be attempting to access.

At 804, the process 800 may generate a sensory output that corresponds to one of the plurality of images. In some embodiments, the sensory output is non-text based so that it does not include text-based CAPTCHA tests, such as text, an image of text, braille, or the like. In some embodiments, the sensory output includes a tactile sensation (e.g., a non-text based tactile sensation) that corresponds to one of the plurality of images. In some embodiments, the tactile sensation includes a non-text based tactile sensation, such as a change in texture of a display, wherein the texture corresponds to the one of the plurality of images. For example, the electrostatic haptic display of the haptic generator 281 may be configured to generate a tactile sensation that creates a change in texture of the display 105 that corresponds to the one of the plurality of images. For example, with reference to FIG. 5, the electrostatic haptic display may generate an electrostatic field that causes the display 105 to have a rough texture similar to the texture of alligator skin, which may be associated with the alligator skin displayed in the image 520. In some embodiments, the tactile sensation includes another type of non-text based tactile sensation, such as a vibrotactile feedback. For example, the vibrotactile generator of the haptic generator 281 may generate a tactile sensation that includes the vibrotactile feedback to a user. In some embodiments, the vibrotactile feedback may include a vibration of one or more components of the device 116. For example, with reference to FIG. 5A, the vibrotactile generator may generate an intense vibration of the device 116 to simulate the feeling of an explosion, which may be associated with the explosion depicted in the image 520A. In some embodiments, the tactile sensation includes another type of non-text based tactile sensation, such as a thermal feedback sensation. For example, with reference to FIG. 5A, the thermal display of the haptic generator 281 may generate a small amount of heat through the display to simulate the feeling of heat from an explosion, which may be associated with the explosion depicted in the image 520A. It will be understood by one of ordinary skill in the art that various other textures, vibrotactile feedback, and/or thermal sensations may be generated.

In some embodiments, the sensory output includes an olfactory sensation. For example, the olfactory sensation may include a smell that corresponds to the one of the plurality of images. In some embodiments, the scent generator 271 may generate an olfactory sensation as a sensory output that a user must cognitively associate with a concept displayed in the image. For example, with reference to FIG. 7, the scent generator 271 may generate the scent of a marshmallow that is associated with the concept of the marshmallows displayed in the image 725. It will be understood by one of ordinary skill in the art that various other scents may be generated.

In some embodiments, the sensory output includes an auditory sensation, such as an audio signal, that corresponds to the one of the plurality of images. In some embodiments, the speaker 251 may generate an audio signal that a user must cognitively associate with a concept displayed in the image. For example, an audio signal may be played along with a tactile sensation and/or an olfactory sensation to assist the user in associating the sensations to the correct image. The audio signal may not explicitly say what is depicted in the images, but instead may play a sound that is associated with the image (e.g., play a sound of a dog barking instead of playing an audio signal that says "dog").

At 806, the process 800 receives input corresponding to a selection of an image of the plurality of images. For example, after a user experiences the sensation, the user may associate the sensation to the concept displayed in the image. Based on the user's association of the sensation, such as the tactile feedback, to the concept depicted in the image, the user may select the image using one or more of the buttons 110 and/or the touch-screen display 105 of device 116.

At 808, the process determines whether the selected image matches the one of the plurality of images for which the sensory output corresponds. For example, once the user selects the image from the plurality of images, the processor 211 of device 116 may receive an indication of the selected image, and may determine whether the selected image is the image that correctly describes the concept illustrated by the sensation. In some embodiments, the processor 211 may determine whether the selected image is the correct image by using a lookup function and/or table, as described above. For example, the processor 211 may refer to the lookup table and may compare the stored, associated image that corresponds to the particular sensation that has been output with the selected image to determine if a match exists. If a match is determined, the processor confirms that the selected image is the correct image for the particular sensation. The processor 211 may then determine whether the user is authorized to access the device, web page, or other service the user may be attempting to access. Accordingly, the processor 211 authenticates the user if the selected image matches the concept illustrated by the sensation. In some embodiments, in addition to basing the access authentication decision on whether the selected image matches the sensation, the processor 211 may also receive additional data, such as the time at which the user first attempted access, a number of attempted selections, a time period between the first presentation of the CAPTCHA on the display 105 and the receipt of an image selection by the user, or the like. It will be understood by one of ordinary skill in the art that other factors may be contemplated when determining access authentication.

In some embodiments, the process 800 further includes generating a second sensory output in response to determining that the selected image matches the one of the plurality of images for which the sensory output corresponds, wherein the second sensory output corresponds to a second one of the plurality of images. The process 800 may further include receiving input corresponding to a selection of a second image of the plurality of images and determining whether the selected second image matches the second one of the plurality of images for which the second sensory output corresponds. For example, as illustrated in FIG. 6, after the user successfully passes a previous CAPTCHA tests 505 and/or 505A by selecting the proper image, the processor 211 may present the user with a second CAPTCHA test 605 by randomly selecting and displaying a set of images 615-630 on the display 105. The processor 211 may then generate a second sensory output that a user must cognitively associate with a concept displayed in one or more of the displayed images 615-630. The second sensory output may be generated by the device 116 in response to determining that the image selected in FIG. 5 and/or 505A matches the image for which the previously generated sensory output corresponds. The second sensory output may include a non-text based output, such as a tactile sensation (e.g., a sensation of a change in texture of a display, a vibrotactile feedback, or the like), an olfactory sensation, or an audio signal that is associated with the image.

Figure 9:
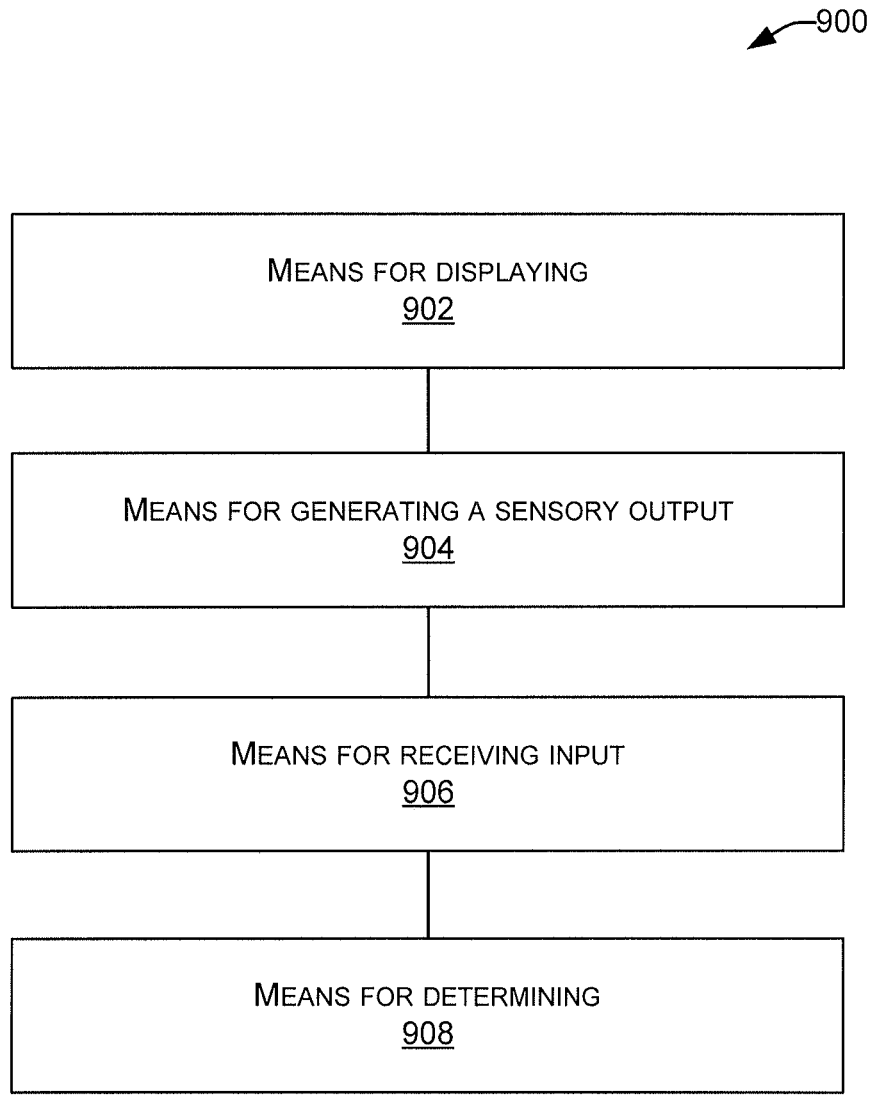
FIG. 9 is a block diagram illustrating an exemplary device according to some embodiments.

FIG. 9 is a block diagram illustrating an exemplary device 900 for providing non-text based authentication using tactile or haptic, olfactory, and/or aural association processing channels that are unique to humans. In some aspects, the device 900 may include the device 116 described above with reference to FIGS. 1-7. In some aspects, the device 900 is configured to implement the process 800 described above with reference to FIG. 8.

Device 900 may include means 902 for displaying a plurality of images. For example, means 902 for displaying may include processor 211, display 105, and/or any other component that may be used to display a plurality of images. The device 900 further includes means 904 for generating a sensory output that corresponds to one of the plurality of images. For example, the means 904 for generating a sensory output may include means for generating a tactile sensation that corresponds to one of the plurality of images. The means 904 for generating a sensory output may include one or more sensation generators, such as a haptic generator 281 that may include an electrostatic haptic display, a vibrotactile generator, and/or a thermal display. The means 904 for generating a sensory output may include one or more other types sensation generators, such as a scent generator 271, a speaker 251, or any other component that may generate a sensory output that can be associated with a concept depicted in an image. The device 900 further includes means 906 for receiving input corresponding to a selection of an image of the plurality of images. For example, the means 906 for receiving input may include the buttons 110, the display 105 configured as a touch-screen display, or any other input device that can receive input from a user. The device 900 further includes means 908 for determining whether the selected image matches the one of the plurality of images for which the sensory output corresponds. For example, the means 908 for determining may include the processor 211 and/or the memory 261, or any other component that may be used to make a determination that a selected image matches an image for which a sensory output corresponds.

The techniques (devices, systems, and processes) described herein use non-text based tactile, olfactory, and/or aural association processing channels that are unique to humans in order to authenticate a user for access to a device, access to a software application, access to a website, purchase of an item, or any other service that the user may attempt to access. The authentication operates to confirm that a user is not a machine or computer that is attempting to access the device or other systems. These non-text based authentication techniques may be image and concept based, requiring the associative processing channels of a human user to cognitively associate a produced sensory output or sensation (e.g., tactile, olfactory, and/or aural sensation) with a concept displayed in a corresponding graphic or image. The non-text based authentication techniques described herein provide numerous advantages over text-based authentication techniques (e.g., graphic, braille, or audio that directly corresponds to the specific displayed text or image of text). For example, the non-text based mental or cognitive authentication tests described herein rely on the association between sensory outputs and concepts depicted in one or more images (which are not text-based), and are thus based on a mental association of the user between the sensory output and the concept displayed in the image or images. As a result, the non-text based authentication techniques provide user-friendly authentication techniques that are resistant to unauthorized access by computers that do not have the ability to make the cognitive leap from a sensory output to a concept depicted in an image.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactured media and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a mobile device, a host computer system (e.g., a desktop computer, a server, etc.), a video game console, a tablet, a smart phone, a kiosk, a point-of-sale terminal, a set-top box, an integrated circuit (IC), a set of ICs (e.g., a chip set), or the like. Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A computer-implemented method, comprising:
displaying, on a display of a system, to a user, a plurality of images, one of the plurality of images corresponding to a first sensation and remaining images of the plurality of images not corresponding to the first sensation, wherein the first sensation has been determined to be cognitively associated, by a plurality of users, with a concept depicted in the one of the plurality of images, the first sensation determined to be cognitively associated by the plurality of users in response to the plurality of users physically sensing the concept depicted in the one of the plurality of images;
generating a tactile stimulus configured to induce the user to sense the first sensation;

in response to the generating the tactile stimulus, receiving input from the user corresponding to a selection of an image of the plurality of images;

determining that the input received in response to the generating the tactile stimulus corresponds to the one of the plurality of images to which the first sensation corresponds; and based on the determining that the input received in response to the generating the tactile stimulus corresponds to the one of the plurality of images to which the first sensation corresponds, authenticating the user for access to the system.

2. The method of claim 1, wherein generating the tactile stimulus includes generating a change in texture of the display, the change in texture configured to induce the user to sense the first sensation; and the input from the user corresponding to a selection of an image of the plurality of images is received in response to the generating the change in texture.

3. The computer-implemented method of claim 2, wherein the concept includes a displayed material representative of a physical material; and the change in texture is determined to be cognitively associated by the plurality of users in response to the plurality of users physically touching the physical material.

4. The method of claim 1, wherein generating the tactile stimulus includes generating a vibrotactile stimulus, the vibrotactile stimulus configured to induce the user to sense the first sensation; and the input from the user corresponding to a selection of an image of the plurality of images is received in response to the generating the vibrotactile stimulus.

5. The method of claim 1, further comprising generating a heating or cooling stimulus configured to induce the user to sense the first sensation; and the input from the user corresponding to a selection of an image of the plurality of images is received in response to the generating the heating or cooling stimulus.

6. The method of claim 1, further comprising generating an olfactory stimulus corresponding to the first sensation; and the input from the user corresponding to a selection of an image of the plurality of images is received in response to the generating the olfactory stimulus.

7. The method of claim 1, further comprising:

in response to determining that the selected image matches the one of the plurality of images to which the first sensation corresponds, generating a tactile stimulus configured to induce the user to sense a second sensation, wherein the second sensation corresponds to a second one of the plurality of images and not to remaining images of the plurality of images, wherein the second sensation has been determined to be cognitively associated, by the plurality of users, with a concept depicted in the second one of the plurality of images, the second sensation determined to be cognitively associated by the plurality of users in response to the plurality of users physically sensing the concept depicted in the second one of the plurality of images;

generating a tactile stimulus configured to induce the user to sense the second sensation;

in response to the generating the tactile stimulus configured to induce the user to sense the second sensation, receiving input from the user corresponding to a selection of an image of the plurality of images;

determining that the input received in response to the generating the tactile stimulus configured to induce the user to sense the second sensation corresponds to the second one of the plurality of images to which the second sensation corresponds; and wherein the authenticating the user for access to the system is based on the determining that the input received in response to the generating the tactile stimulus configured to induce the user to sense the second sensation corresponds to the second one of the plurality of images to which the second sensation corresponds.

8. The computer-implemented method of claim 1, wherein the concept includes a displayed material representative of a physical material; and the first sensation is determined to be cognitively associated by the plurality of users in response to the plurality of users physically sensing the physical material.

9. An apparatus, comprising:

a display of a system configured to display, to a user of the apparatus, a plurality of images;

a tactile stimulus generator;

an input device configured to receive, from the user, input corresponding to a selection of an image of the plurality of images; and one or more processors communicatively coupled to the display, the tactile stimulus generator, and the input device, the one or more processors configured to:

induce the display to output the plurality of images, one of the plurality of images corresponding to a first sensation and remaining images of the plurality of images not corresponding to the first sensation, wherein the first sensation has been determined to be cognitively associated, by a plurality of users, with a concept depicted in the first image of the plurality of images, the first sensation determined to be cognitively associated by the plurality of users in response to the plurality of users physically sensing the concept depicted in the one of the plurality of images;

induce the tactile stimulus generator to generate a tactile stimulus configured to induce the user to sense the first sensation;

receive an input, in response to the generating the tactile stimulus, via the input device, from the user, corresponding to a selection of an image of the plurality of images;

determine that the input received in response to the generating the tactile stimulus corresponds to the one of the plurality of images to which the sensation corresponds; and based on determining that the input received in response to the generating the tactile stimulus corresponds to the one of the plurality of images to which the first sensation corresponds, authenticate the user for access to the system.

10. The apparatus of claim 9, wherein the one or more processors are further configured to:

induce the tactile stimulus generator to generate a change in texture of the display, the change in texture configured to induce the user to sense the first sensation; and wherein the input from the user corresponding to a selection of an image of the plurality of images is received in response to the generating the change in texture.

11. The apparatus of claim 10, wherein the concept includes a displayed material representative of a physical material; and the change in texture is determined to be cognitively associated by the plurality of users in response to the plurality of users physically touching the physical material.

12. The apparatus of claim 9, wherein the one or more processors are further configured to:
induce the tactile stimulus generator to generate a vibrotactile stimulus; and
wherein the input from the user corresponding to a selection of an image of the plurality of images is received in response to the generating the vibrotactile stimulus.

13. The apparatus of claim 9, further comprising one or more heating or cooling elements and the first sensation includes a heating or cooling sensation; and
the one or more processors is further configured to induce the one or more heating or cooling elements to generate a heating or cooling stimulus configured to induce the user to sense the heating or cooling sensation.

14. The apparatus of claim 9, further comprising a scent generator and the first sensation includes an olfactory sensation;
wherein the one or more processors is further configured to induce the scent generator to generate an olfactory stimulus configured to induce the user to sense the olfactory sensation.

15. The apparatus of claim 9, wherein the one or more processors is further configured to, in response to determining that the selected image matches the one of the plurality of images to which the first sensation corresponds:
induce the tactile stimulus generator to generate a tactile stimulus configured to induce the user to sense a second sensation, wherein the second sensation has been determined to be cognitively associated, by the plurality of users, with a concept depicted in a second one of the plurality of images, the second sensation determined to be cognitively associated by the plurality of users in response to the plurality of users physically sensing the concept depicted in the second one of the plurality of images;
in response to the generating the tactile stimulus configured to induce the user to sense the second sensation, receive an input, via the input device, from the user, corresponding to a selection of a second image of the plurality of images;
determining that the input received in response to the generating the tactile stimulus configured to induce the user to sense the second sensation corresponds to the second one of the plurality of images to which the second sensation corresponds; and
wherein the authenticating the user for access to the system is based on the determining that the input received in response to the generating the tactile stimulus configured to induce the user to sense the second sensation corresponds to the second one of the plurality of images to which the second sensation corresponds.

16. The apparatus of claim 9, wherein the concept includes a displayed material representative of a physical material; and
the first sensation is determined to be cognitively associated by the plurality of users in response to the plurality of users physically sensing the physical material.

17. One or more non-transitory computer-readable media storing computer-executable instructions that, when executed, configure one or more computing devices to:
display, on a display of a system, to a user, a plurality of images, one of the plurality of images corresponding to a first sensation and remaining images of the plurality of images not corresponding to the first sensation, wherein the first sensation has been determined to be cognitively associated, by a plurality of users, with a concept depicted in the one of the plurality of images, the first sensation determined to be cognitively associated by the plurality of users in response to the plurality of users physically sensing the concept depicted in the one of the plurality of images;
generate a tactile stimulus configured to induce the user to sense the first sensation;
in response to the generating the tactile stimulus, receive input from the user corresponding to a selection of an image of the plurality of images;
determine that the input received in response to the generating the tactile stimulus corresponds to the one of the plurality of images to which the first sensation corresponds; and
based on the determining that the input received in response to the generating the tactile stimulus corresponds to the one of the plurality of images to which the first sensation corresponds, authenticate the user for access to the system.

18. The computer-readable media of claim 17, wherein generating the tactile stimulus includes generating a change in texture of the display, the change in texture configured to induce the user to sense the first sensation; and
the input from the user corresponding to a selection of an image of the plurality of images is received in response to the generating the change in texture.

19. The one or more non-transitory computer-readable media of claim 18, wherein the concept includes a displayed material representative of a physical material; and
the change in texture is determined to be cognitively associated by the plurality of users in response to the plurality of users physically touching the physical material.

20. The computer-readable media of claim 17, wherein generating the tactile stimulus includes generating a vibrotactile stimulus, the vibrotactile stimulus configured to induce the user to sense the first sensation; and
the input from the user corresponding to a selection of an image of the plurality of images is received in response to the generating the vibrotactile stimulus.

21. The computer-readable media of claim 17, wherein generating the tactile stimulus includes generating a heating or cooling stimulus, the heating or cooling stimulus configured to induce the user to sense the first sensation; and
the input from the user corresponding to a selection of an image of the plurality of images is received in response to the generating the heating or cooling stimulus.

22. The computer-readable media of claim 17, wherein generating the tactile stimulus includes generating an olfactory stimulus, the olfactory stimulus configured to induce the user to sense the first sensation; and
the input from the user corresponding to a selection of an image of the plurality of images is received in response to the generating the olfactory stimulus.

23. The computer-readable media of claim 17, wherein the instructions, when executed, cause the one or more computing devices to:
in response to determining that the selected image matches the one of the plurality of images to which the first sensation corresponds, generate a tactile stimulus configured to induce the user to sense a second sensation, wherein the second sensation corresponds to a second one of the plurality of images and not to remaining images of the plurality of images, wherein the second sensation has been determined to be cognitively associated, by the plurality of users, with a concept depicted in the second one of the plurality of images, the second sensation determined to be cognitively associated by the plurality of users in response to the plurality of users physically sensing the concept depicted in the second one of the plurality of images;

generate a tactile stimulus configured to induce the user to sense the second sensation;

in response to the generating the tactile stimulus configured to induce the user to sense the second sensation, receive input from the user corresponding to a selection of an image of the plurality of images;

determine that the input received in response to the generating the tactile stimulus configured to induce the user to sense the second sensation corresponds to the second one of the plurality of images to which the second sensation corresponds; and wherein the authenticating the user for access to the system is based on the determining that the input received in response to the generating the tactile stimulus configured to induce the user to sense the second sensation corresponds to the second one of the plurality of images to which the second sensation corresponds.

24. The one or more non-transitory computer-readable media of claim 17, wherein the concept includes a displayed material representative of a physical material; and the first sensation is determined to be cognitively associated by the plurality of users in response to the plurality of users physically sensing the physical material.

25. An apparatus, comprising:

means for displaying, on a display of a system, to a user, a plurality of images, one of the plurality of images corresponding to a first sensation and remaining images of the plurality of images not corresponding to the first sensation, wherein the first sensation has been determined to be cognitively associated, by a plurality of users, with a concept depicted in the one of the plurality of images, the first sensation determined to be cognitively associated by the plurality of users in response to the plurality of users physically sensing the concept depicted in the one of the plurality of images;

means for generating a tactile stimulus configured to induce the user to sense the first sensation;

means for, in response to the generating the tactile stimulus, receiving input from the user corresponding to a selection of an image of the plurality of images;

means for determining that the input received in response to the generating the tactile stimulus corresponds to the one of the plurality of images to which the first sensation corresponds; and means for, based on the determining that the input received in response to the generating the tactile stimulus corresponds to the one of the plurality of images to which the first sensation corresponds, authenticating the user for access to the system.

26. The apparatus of claim 25, wherein the means for generating the tactile stimulus includes a means for changing a texture of the display, the change in texture configured to induce the user to sense the first sensation; and the input from the user corresponding to a selection of an image of the plurality of images is received in response to the generating the change in texture.

27. The apparatus of claim 26, wherein the concept includes a displayed material representative of a physical material; and the change in texture is determined to be cognitively associated by the plurality of users in response to the plurality of users physically touching the physical material.

28. The apparatus of claim 25, wherein the means for generating the tactile stimulus includes a means for generating a heating or cooling stimulus configured to induce the user to sense the first sensation; and the input from the user corresponding to a selection of an image of the plurality of images is received in response to the generating the heating or cooling stimulus.

29. The apparatus of claim 25, further comprising:

means for, in response to determining that the selected image matches the one of the plurality of images to which the first sensation corresponds, generating a tactile stimulus configured to induce the user to sense a second sensation, wherein the second sensation corresponds to a second one of the plurality of images and not to remaining images of the plurality of images, wherein the second sensation has been determined to be cognitively associated, by the plurality of users, with a concept depicted in the second one of the plurality of images, the second sensation determined to be cognitively associated by the plurality of users in response to the plurality of users physically sensing the concept depicted in the second one of the plurality of images;

means for generating a tactile stimulus configured to induce the user to sense the second sensation;

means for, in response to the generating the tactile stimulus configured to induce the user to sense the second sensation, receiving input from the user corresponding to a selection of an image of the plurality of images;

means for determining that the input received in response to the generating the tactile stimulus configured to induce the user to sense the second sensation corresponds to the second one of the plurality of images to which the second sensation corresponds; and wherein the authenticating the user for access to the system is based on the determining that the input received in response to the generating the tactile stimulus configured to induce the user to sense the second sensation corresponds to the second one of the plurality of images to which the second sensation corresponds.

30. The apparatus of claim 25, wherein the concept includes a displayed material representative of a physical material; and the first sensation is determined to be cognitively associated by the plurality of users in response to the plurality of users physically sensing the physical material.

* * * * *